C. Lidren.
Self Raker.
N° 88394. Patented Mar. 30. 1869.
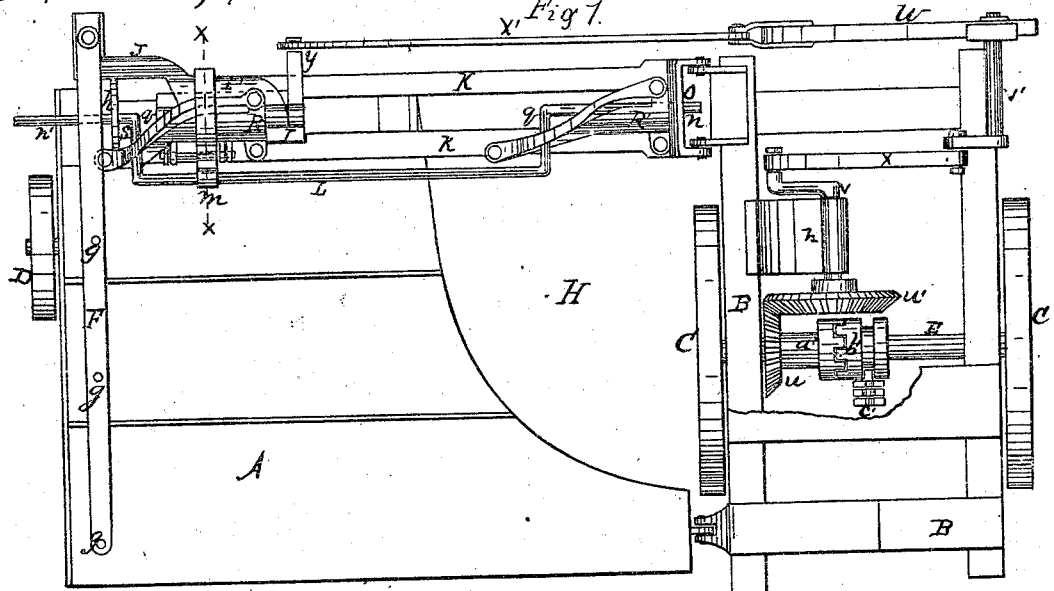
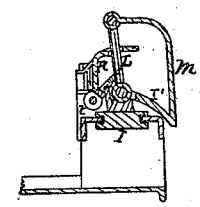
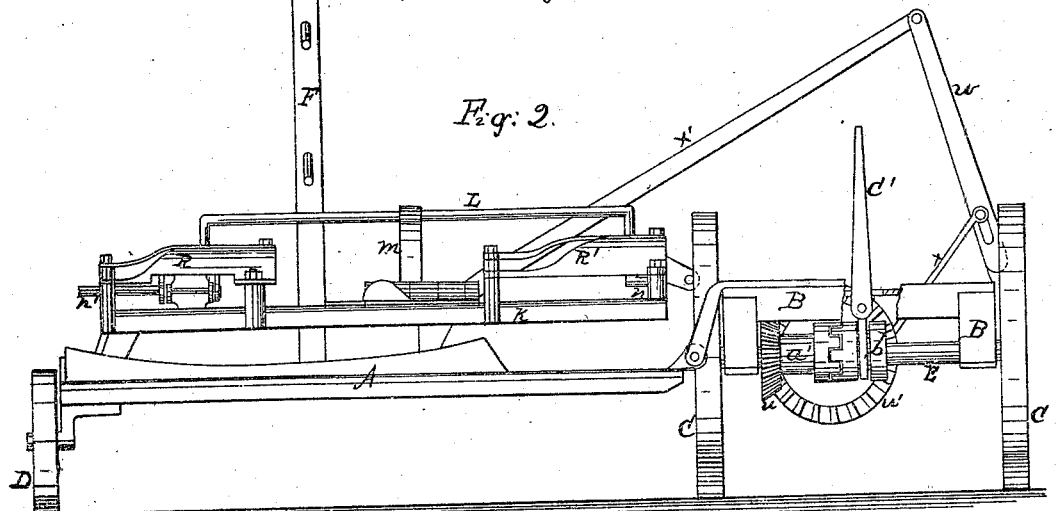

UNITED STATES PATENT OFFICE.

C. LIDREN, OF LAFAYETTE, IND., ASSIGNOR TO HIMSELF AND R. JACKSON.

IMPROVEMENT IN HARVESTER-RAKES.

Specification forming part of Letters Patent No. 88,394, dated March 30, 1869.

*To all whom it may concern:*

Be it known that I, C. LIDREN, of Lafayette, in the county of Tippecanoe and State of Indiana, have invented a new and useful Improvement in Automatic Rakers for Harvesters; and I do hereby declare that the following is a full, clear, and exact description thereof, which will enable those skilled in the art to make and use the same, reference being had to the accompanying drawings, forming a part of this specification.

This invention relates to new and useful improvements in the method of operating automatic rakers for reaping or harvesting machines, whereby the mechanism for operating such rakes is very much simplified; and it consists in operating the rake by means of motion imparted from the axle to an oscillating arm, connecting-rods, and slotted cams, in the manner hereinafter more fully described.

In the accompanying plate of drawings, Figure 1 represents a top or plan view of a self-raking apparatus constructed according to my invention, showing the rake down upon the platform. Fig. 2 is a front view of the same, showing the rake elevated. Figure 3 represents a vertical section through the line $x\,x$ of Fig. 1, showing the latch for holding the bail in position.

Similar letters of reference indicate corresponding parts.

A represents the platform which receives the grain from the cutters.

B represents the frame-work, which is (with the platform and other apparatus attached) supported on the driving-wheels C C and the bearing-wheel D on the opposite side of the machine.

E represents the axle or shaft from which motion is imparted to the mechanism which operates the rake.

F is the rake, provided with a suitable number of teeth, $g$, which are made to sweep across the platform in a horizontal position, as seen in Fig. 1, and deposit the cut grain which falls upon the platform in gavels upon the ground through the open space H. The rake is connected with a carriage by the arm J. The carriage is made in two parts, I and I', which are hinged together and move back and forth on the ways K K, carrying the rake, as before mentioned. The hinged portion I' of the carriage is connected with a bail, L, by the arm $m$.

This arm slides on the bail as the carriage moves back and forth. The bail is given a compound motion—that is, a longitudinal and an oscillating motion simultaneously. It slides and partially rotates on its ends $n\,n'$, which pass through orifices—one end, $n$, through the hinge $o$, and the other end, $n'$, through a plate, $p$. The former or longitudinal motion is imparted by the carriage, which in its movement strikes the angles $q\,q$ of the bail. The latter or oscillating motion is produced by the two slotted cams R R'. These cams are so formed that when the longitudinal motion is given to the bail the bail is at the same time turned nearly one-fourth of a revolution, thereby turning backward and forward the hinged portion of the carriage I', and consequently through the arm $m$ depressing the rake or throwing it into a horizontal position for the commencement of the stroke or sweep, and raising it to an angle of about forty-five degrees at the termination of the stroke. The slots of the cams are made to inclose the angular portions $s\,s$ of the bail, as seen in the drawings. At the termination of the stroke the bail is held in position by the latch $t$, (seen in Fig. 3,) while the rake passes out from the machine and is carried back in an elevated position.

It will be noticed that the bail slides some distance in each of the cams for the purpose of giving room and time for the rake to operate in case the outer end of the platform is elevated or depressed from a level position in passing over uneven ground.

The hinged portion I' of the carriage acts as a counterbalance to the rake, thereby greatly lessening the power required for raising and depressing it, and otherwise lessening the friction and consequently the wear and tear of the machine.

As before mentioned, the axle E by its revolution imparts motion to the rake, which motion is conveyed from the pair of bevel-wheels $u\,u'$ by the crank-shaft $v\,v'$, oscillating arm $w$, and connecting-rods $x\,x'$, which latter rod is attached to the carriage, as seen at $y$.

$z$ is a box-bracket, which supports the crank-shaft $v$, in which the shaft revolves and to which shaft the wheel $u'$ is attached. The wheel $u$ is attached to a sleeve-coupling, $a'$, through which the axle revolves when the machine is uncoupled.

$b'$ is a clutch, which slides on the axle on a feather, and of course revolves with the axle at all times; but it is thrown out of and into gear with the sleeve-coupling $a'$ by the shifting-lever $c'$. In operating the machine this shifting-lever is under the control of the driver, so that the movement of the rake may be regulated as desired for making the gavels of grain greater or less in size, as the case may be.

I claim as new and desire to secure by Letters Patent—

1. The slotted cams R R', the bail L, and the hinged carriage I I', arranged and operating substantially as and for the purposes herein shown and described.

2. The latch $t$, for holding the bail in position, substantially as and for the purposes set forth.

3. In combination with the automatic raker F, the gear-wheels $u\ u'$ and coupling $a'\ b'$, with the shafts, cranks, arms, and rods by which motion is conveyed to the carriage, arranged substantially as shown and described, for the purpose specified.

CHR. LIDREN.

Witnesses:
D. W. McCune,
Wm. Pointer.